United States Patent
Jacquel et al.

(10) Patent No.: US 12,134,680 B2
(45) Date of Patent: Nov. 5, 2024

(54) METHOD FOR CRYSTALLIZING A POLYESTER COMPRISING AT LEAST ONE 1,4:3,6-DIANHYDROHEXITOL UNIT

(71) Applicant: ROQUETTE FRERES, Lestrem (FR)

(72) Inventors: Nicolas Jacquel, Pontarlier (FR); René Saint-Loup, Lomme (FR); Audrey Dausque, Houplines (FR); Sébastien Naudin, Coutances (FR); Nicolas Descamps, Sainghin-en-Melantois (FR)

(73) Assignee: Roquette Freres, Lestrem (FR)

( * ) Notice: Subject to any disclaimer, the term of this patent is extended or adjusted under 35 U.S.C. 154(b) by 910 days.

(21) Appl. No.: 17/059,948

(22) PCT Filed: May 29, 2019

(86) PCT No.: PCT/FR2019/051282
§ 371 (c)(1),
(2) Date: Sep. 8, 2021

(87) PCT Pub. No.: WO2019/229394
PCT Pub. Date: Dec. 5, 2019

(65) Prior Publication Data
US 2022/0267514 A1     Aug. 25, 2022

(30) Foreign Application Priority Data

May 31, 2018     (FR) ..................... 18 54738

(51) Int. Cl.
*C08G 63/80*     (2006.01)
*C08G 63/672*     (2006.01)

(52) U.S. Cl.
CPC ........... *C08G 63/80* (2013.01); *C08G 63/672* (2013.01)

(58) Field of Classification Search
CPC ....... C08G 63/672; C08G 63/78; C08G 63/80
See application file for complete search history.

(56) References Cited

U.S. PATENT DOCUMENTS

| | | | |
|---|---|---|---|
| 4,963,644 A | 10/1990 | Duh | |
| 5,391,694 A | 2/1995 | Duh et al. | |
| 5,663,290 A | 9/1997 | Herbert et al. | |
| 5,744,578 A | 4/1998 | Duh | |
| 5,959,066 A * | 9/1999 | Charbonneau | C08G 63/672 528/271 |
| 6,063,464 A * | 5/2000 | Charbonneau | C08G 63/668 428/364 |
| 6,063,495 A * | 5/2000 | Charbonneau | C08G 63/672 264/211.14 |
| 6,140,422 A * | 10/2000 | Khanarian | C08L 71/00 525/437 |
| 2003/0139566 A1* | 7/2003 | Parthasarathy | C08G 63/83 528/274 |
| 2004/0236066 A1* | 11/2004 | Moore | C08G 63/672 528/308.1 |
| 2011/0065871 A1 | 3/2011 | Nagano et al. | |
| 2017/0233525 A1† | 8/2017 | Kulkarni et al. | |
| 2019/0055349 A1* | 2/2019 | Lee | C08G 63/183 |

FOREIGN PATENT DOCUMENTS

| | | | |
|---|---|---|---|
| EP | 1 088 016 | † | 9/2006 |
| EP | 1 088 016 B1 | | 9/2006 |
| KR | 10-2017-0114829 | † | 10/2017 |
| KR | 10-2017-0114829 A | | 10/2017 |
| WO | 9954375 A1 | | 10/1999 |
| WO | WO2018024988 | | 2/2018 |
| WO | WO2018024995 | | 2/2018 |

OTHER PUBLICATIONS

Won Jae Yoon et al "Synthesis and Characteristics of a Biobased High-Tg Terpolyester of Isosorbide, Ethylene Glycol, and 1,4-Cyclohexane Dimethanol: Effect of Ethylene Glycol as a Chain Linker on Polymerization", Macromolecules 2013, 46, 7219-7231 (Year: 2013).*
J. M. Koo et al "Structural and thermal properties of poly(1,4-cyclohexane dimethylene terephthalate) containing isosorbide", Polym. Chem., 2015, 6, pp. 6973-698. (Year: 2015).*
The Third Party Observation, mailed by the European Patent Office on Feb. 18, 2022, in the related European Appl. No. 19737183.4.
The third party submission by Claudia Siu, "Concise Description of Relevance," submitted on Nov. 2, 2022.

\* cited by examiner
† cited by third party

*Primary Examiner* — Frances Tischler
*Assistant Examiner* — Gennadiy Mesh

(57) ABSTRACT

A crystallization method that comprises a step of providing a polyester comprising at least one 1,4:3,6-dianhydrohexitol unit, and a step of crystallizing this semi-crystalline polyester at a pressure of at least 600 mbar absolute. The method according to the invention makes it possible to strongly limit, or even eliminate, the phenomenon of polyester expansion during crystallization. Advantageously, the elimination of the expansion phenomenon through pressure conditions implemented according to the invention thus makes it possible to dispense with obtaining very fragile empty spheres that break when agitated and thus cause the formation of undesirable fine particles.

10 Claims, No Drawings

METHOD FOR CRYSTALLIZING A POLYESTER COMPRISING AT LEAST ONE 1,4:3,6-DIANHYDROHEXITOL UNIT

FIELD OF THE INVENTION

The invention relates to the field of polymers and most particularly relates to a method for the crystallization of polyester comprising 1,4:3,6-dianhydrohexitol units.

TECHNOLOGICAL BACKGROUND OF THE INVENTION

Polyethylene terephthalate (PET) is a widely used plastic material with numerous industrial applications. However, under certain conditions of use or for certain specific applications, this polyester does not necessarily have all the required properties. Thus, glycol-modified PETs (PETg) have been developed. These are generally polyesters comprising, in addition to ethylene glycol and terephthalic acid units, cyclohexanedimethanol (CHDM) units. The introduction of this diol into the PET enables it to adapt its properties to the targeted application, for example to improve its impact resistance or its optical properties.

For essentially ecological reasons, plastics materials originating from petrochemicals are increasingly less sought after and novel solutions have begun to come to light.

Renewable sources have thus appeared in thermoplastic polyesters and other modified PETs have been developed by introducing, into the polyester, 1,4:3,6-dianhydrohexitol units, in particular isosorbide. These modified polyesters have higher glass transition temperatures than conventional PET (Tg=75-80° C.) or PETgs comprising CHDM (Tg=75-85° C.), and therefore have improved thermomechanical characteristics. In comparison, the glass transition of PET copolyesters containing isosorbide may extend up to 210° C. Polyesters comprising isosorbide units are polyesters which are eligible for the manufacture of numerous specialty products.

Conventionally, polyesters are obtained via the melt route, but this technique does not make it possible to reach the high molar masses (>16,000 g/mol) required for applications that need significant mechanical properties or the high melt viscosities needed for their transformation.

Thus, higher molar masses can be obtained via a particular method, namely solid-state post-condensation of the polymer and, particularly, of the polyester. For example, it is generally this method which is implemented to obtain fiber-grade or bottle-grade polyesters, i.e., polyesters meeting the qualitative criteria imposed by industrial standards for the manufacture of fibers or bottles.

Generally, solid-state post-condensation is carried out in two phases. In a first phase, the polyester granules are crystallized under a nitrogen stream or under vacuum at a temperature close to the optimal crystallization temperature of the polyester in question. The pressures thus implemented are less than 10 mbar absolute and generally 5 mbar absolute. The benefit of crystallization is to avoid the agglomeration of the granules at high temperatures and to concentrate the ends of the chains in amorphous regions.

Once crystallized, the granules are subsequently heated in a second phase at higher temperatures, in order to carry out the solid-state post-condensation proper, generally between 5° C. and 20° C. below the melting point of the polymer. This step makes it possible to increase the molar mass of the polymer. Industrially, the crystallization and the solid-state post-condensation are carried out under vacuum, which is preferred to a more expensive stream of nitrogen. As previously stated, the pressures thus implemented are less than 10 mbar absolute and generally close to 5 mbar absolute.

For the majority of polyesters, under these conditions, the crystallization step does not pose any particular problem. However, the Applicant has observed that polyesters containing 1,4:3,6-dianhydrohexitol units, in particular isosorbide, tended to expand during the crystallization step. For a polymer specialist skilled in the art, this expansion phenomenon is also known by the term "pop-corning".

This expansion phenomenon of polyesters comprising 1,4:3,6-dianhydrohexitol units poses several problems. Firstly, the formation of o expanded granules of polyesters leads to obtaining very fragile empty spheres, which break when agitated and thus cause the formation of undesirable fine particles. Secondly, the expansion phenomenon causes the macroscopic destructuring of the polyester, leading to the creation of heterogeneous polyester granules: they have non-homogeneous morphologies and are liable to change at different rates, for example during a solid-state post-condensation step. This leads to a heterogeneity of the molar masses of the polyester. Thirdly, the Applicant has also observed increased agglomeration of these expanded granules, making its metering considerably more complex and less precise.

Thus, it would be entirely advantageous to be able to limit or even eliminate the expansion phenomenon caused by the crystallization of polyesters comprising 1,4:3,6-dianhydrohexitol units.

Research has shown that very few documents deal with expansion phenomena during crystallization. However, this phenomenon has been known since the 1990s in the case of polyethylene naphthalate (PEN).

In order to eliminate expansion, document U.S. Pat. No. 4,963,644, relating to a method for crystallizing polyethylene naphthalate, describes the use of a nitrogen stream or the establishment of a vacuum in order to carry out devolatilization between the glass transition temperature and the softening point, i.e., when the polymer is not yet in a softened state. However, this solution leads to increased crystallization time, making the method less effective and more expensive.

Document U.S. Pat. No. 5,663,290 describes that polyethylene naphthalate can be dried beforehand during the granulation in order to be below a water content limit, beyond which the expansion phenomenon appears (4200 ppm in the case of PEN). The granulation is thus carried out in an underwater pelletizer, then a stream of inert gas makes it possible to dry the granules at ambient temperature. These granules obtained are then bagged under vacuum in order to prevent the material from taking on more water. However, this solution requires modifying the granulation method, a significant and expensive amount of inert gas, and complicates the packaging and use of the granules.

Document U.S. Pat. No. 5,744,578 describes a crystallization of a PEN prepolymer in the presence of a pressurizing liquid or mixture of liquids which does not degrade the polymer. If the liquid does not have a sufficient vapor pressure to prevent the expansion of the granules, the medium is pressurized with an inert gas. This method is not particularly beneficial since it requires an additional step of separating the polymer and the liquid.

All these solutions known to date relate to polyethylene naphthalate homopolymers or copolymers and are not entirely satisfactory or transferable to polyesters containing 1,4:3,6-dianhydrohexitol units.

In order to limit expansion phenomena of polyesters liable to be post-condensed, document U.S. Pat. No. 5,391,694 describes modifying the shape of said granules by using special dies for the granulation. By modifying the morphology of the granules, the diffusion of water or air can be accelerated during crystallization, just like that of the coproducts during post-condensation, which increases the speed of SSP. This solution is relatively restrictive since it requires the installation of a special die upstream of the method, which also makes the method more expensive.

Thus, there is still a need to develop novel methods making it possible to eliminate the expansion phenomenon observed during the crystallization of polyesters comprising 1,4:3,6-dianhydrohexitol units, said methods not having the disadvantages of the methods of the prior art.

It is therefore to the Applicant's credit to have developed, via particular conditions during the crystallization step, a method making it possible to limit, or even dispense with, the expansion phenomenon of polyesters comprising 1,4:3,6-dianhydrohexitol units, in particular isosorbide, and to thus eliminate the problems this causes.

SUMMARY OF THE INVENTION

The invention relates to a method for crystallizing a polyester comprising at least one 1,4:3,6-dianhydrohexitol unit, and comprising the following steps of:
  providing a semi-crystalline polyester comprising at least one 1,4:3,6-dianhydrohexitol unit,
  crystallizing said polyester,
said method being characterized in that the crystallization step is performed at a pressure of at least 600 mbar absolute.

The method according to the invention has the advantage of limiting, or even dispensing with, the expansion phenomenon observed during crystallization of polyesters comprising at least one 1,4:3,6-dianhydrohexitol unit. Thus, the method no longer generates granules in the form of fragile spheres that break and cause fine particles it does not lead to the macroscopic destructuring of the polyester, which is the cause of heterogeneous granules, and finally, by limiting the formation of these granules, it renders inoperative the undesirable phenomenon of agglomeration of said granules.

DETAILED DESCRIPTION OF THE INVENTION

The invention relates to a method for crystallizing a polyester comprising at least one 1,4:3,6-dianhydrohexitol unit, and comprising the following steps of:
  providing a semi-crystalline polyester comprising at least one 1,4:3,6-dianhydrohexitol unit,
  crystallizing said polyester,
said method being characterized in that the crystallization step is performed at a pressure of at least 600 mbar absolute.

The method according to the invention thus makes it possible to obtain a crystallized polyester.

Surprisingly, the Applicant has observed that the expansion phenomenon observed during crystallization of polyesters comprising at least one 1,4:3,6-dianhydrohexitol unit was able to be greatly limited, or even completely eliminated, when particular conditions were implemented during the crystallization. Indeed, when the crystallization is carried out at a pressure of at least 600 mbar absolute, the phenomenon is greatly limited and is eliminated for pressures of at least 800 mbar absolute.

The conditions identified by the Applicant make it possible, compared to the solutions proposed by the prior art in the case of polyethylene naphthalate, to obtain a less expensive and quicker method for crystallizing a polyester comprising at least one 1,4:3,6-dianhydrohexitol unit.

The first step of the crystallization method according to the invention therefore consists in providing a semi-crystalline polyester comprising a 1,4:3,6-dianhydrohexitol unit.

According to the present invention, the 1,4:3,6-dianhydrohexitol unit may be isosorbide, isomannide, isoidide, or a mixture thereof. Preferably, the 1,4:3,6-dianhydrohexitol unit is isosorbide.

Isosorbide, isomannide and isoidide can be obtained, respectively, by dehydration of sorbitol, mannitol and iditol. Regarding isosorbide, it is sold by the Applicant under the trade name of POLYSORB® Isosorbide.

The polyester provided in this first step may be in a form conventionally used by a person skilled in the art, namely, for example, in the form of granules.

According to a particular embodiment, the polyester implemented in the crystallization method according to the invention is a semi-crystalline thermoplastic polyester comprising:
  at least one 1,4:3,6-dianhydrohexitol unit (A),
  at least one diol unit (B), other than the 1,4:3,6-dianhydrohexitol unit (A),
  at least one aromatic dicarboxylic acid unit (C).

According to this embodiment, the 1,4:3,6-dianhydrohexitol unit (A) is as defined previously.

The diol unit (B) of the thermoplastic polyester may be an alicyclic diol unit, a non-cyclic aliphatic diol unit, or a mixture of an alicyclic diol unit and a non-cyclic aliphatic diol unit.

In the case of an alicyclic diol unit, also referred to as aliphatic and cyclic diol, this is a unit other than the 1,4:3,6-dianhydrohexitol unit. This may thus be a diol selected from the group comprising 1,4-cyclohexanedimethanol, 1,2-cyclohexanedimethanol, 1,3-cyclohexanedimethanol, spiroglycol, tricyclo[5.2.1.0$^{2,6}$]decanedimethanol (TCDDM), 2,2,4,4-tetramethyl-1,3-cyclobutanediol, tetrahydrofurandimethanol (THFDM), furandimethanol, 1,2-cyclopentanediol, 1,3-cyclopentanediol, 1,2-cyclohexanediol, dioxane glycol (DOG), norbornane diols, adamantane diols, pentacyclopentadecane dimethanols or a mixture of these diols. The alicyclic diol unit is preferably 1,4-cyclohexanedimethanol. The alicyclic diol unit (B) may be in the cis configuration, in the trans configuration or may be a mixture of diols in cis and trans configuration.

In the case of a non-cyclic aliphatic diol unit, this may be a linear or branched non-cyclic aliphatic diol, said non-cyclic aliphatic diol also being able to be saturated or unsaturated. A saturated linear non-cyclic aliphatic diol is, for example, ethylene glycol, 1,3-propanediol, 1,4-butanediol, 1,5-pentanediol, 1,6-hexanediol, 1,8-octanediol and/or 1,10-decanediol. A saturated branched non-cyclic aliphatic diol is, for example, 2-methyl-1,3-propanediol, 2,2,4-trimethyl-1,3-pentanediol, 2-ethyl-2-butyl-1,3-propanediol, propylene glycol and/or neopentyl glycol. An unsaturated aliphatic diol unit is, for example, cis-2-butene-1,4-diol. The non-cyclic aliphatic diol unit is preferably ethylene glycol.

The aromatic dicarboxylic acid unit (C) is selected from aromatic dicarboxylic acids known to a person skilled in the art. The aromatic dicarboxylic acid may be a derivative of naphthalates, terephthalates, furanoates, thiophene dicarboxylate, pyridine dicarboxylate or else isophthalates or mixtures thereof. Advantageously, the aromatic dicarboxylic acid is a derivative of terephthalates and preferably, the aromatic dicarboxylic acid is terephthalic acid.

The amounts of different units will be able to be readily adapted by a person skilled in the art in order to obtain a semi-crystalline character. For example, a semi-crystalline thermoplastic polyester may comprise:
- a molar amount of 1,4:3,6-dianhydrohexitol units (A) ranging from 1 to 15 mol %;
- a molar amount of alicyclic diol units (B) other than the 1,4:3,6-dianhydrohexitol units (A) ranging from 30 to 54 mol %;
- a molar amount of terephthalic acid units (C) ranging from 45 to 55 mol %.

The molar amounts being expressed relative to the total molar amounts of said polyester.

Still according to this particular embodiment, the molar ratio of 1,4:3,6-dianhydrohexitol units (A)/sum of the 1,4:3,6-dianhydrohexitol units (A) and of the diol units (B) other than the 1,4:3,6-dianhydrohexitol units (A), i.e., (A)/[(A)+(B)] is at least 0.01 and at most 0.90. Advantageously, this ratio is at least 0.05 and at most 0.65.

According to a first variant of this particular embodiment, the diol unit (B) of the thermoplastic polyester the polyester is an alicyclic diol unit selected from the group comprising 1,4-cyclohexanedimethanol, 1,2-cyclohexanedimethanol, 1,3-cyclohexanedimethanol, or a mixture of these diols. The alicyclic diol unit is preferably 1,4-cyclohexanedimethanol. Thus, according to this variant, the polyester is devoid of ethylene glycol.

According to a second variant of this particular embodiment, the diol unit (B) of the thermoplastic polyester the polyester is a saturated linear non-cyclic aliphatic diol selected from the group comprising ethylene glycol, 1,3-propanediol, 1,4-butanediol, 1,5-pentanediol, 1,6-hexanediol, 1,8-octanediol and/or 1,10-decanediol. Preferably, the saturated linear non-cyclic aliphatic diol is ethylene glycol.

The second step of the method consists in crystallizing said polyester. Crystallization is a phenomenon via which a body, in this instance polyester, partially enters the crystal state.

The step of crystallization of the polyester is obtained by heating to the crystallization temperature. More specifically, the polyester is gradually heated following a temperature ramp up to the crystallization temperature. This temperature is then maintained for sufficient time to enable its maximum crystallization.

The crystallization temperature depends on each polyester. However, it is a feature that is known and/or measurable by a person skilled in the art.

Thus, in the method according to the invention, the temperature implemented for the crystallization of the polyester is determined by a person skilled in the art based on differential scanning calorimetry (DSC) studies.

Conventionally, for polyesters comprising a 1,4:3,6-dianhydrohexitol unit, the crystallization step is carried out under vacuum at a pressure of less than 10 mbar absolute, such as, for example, 5 mbar absolute. As previously stated, the Applicant has observed that the crystallization of polyesters comprising a 1,4:3,6-dianhydrohexitol unit under these customary pressure conditions led to the expansion of said polyester. After a great deal of research, the Applicant however identified particular conditions which made it possible to greatly limit, or even completely eliminate, this phenomenon.

Thus, according to the method of the invention, the step of crystallizing the polyester comprising a 1,4:3,6-dianhydrohexitol unit is carried out under a pressure of at least 600 mbar absolute. Most particularly, the crystallization is carried out under a pressure of at least 700 mbar absolute, at least 800 mbar absolute, at least 900 mbar absolute, and even at least 1000 mbar absolute. Above 800 mbar absolute of pressure, the expansion phenomenon of the polyester is completely eliminated.

According to a particular embodiment, the crystallization of the polyester comprising a 1,4:3,6-dianhydrohexitol unit is carried out under a pressure within the range extending from 600 mbar absolute and up to atmospheric pressure.

According to another particular embodiment, the crystallization step is carried out at a pressure of from 800 mbar absolute to 1000 mbar absolute.

Advantageously, the elimination of the expansion phenomenon through pressure conditions implemented according to the invention makes it possible to avoid the formation of expanded polyester granules and thus to dispense with obtaining very fragile empty spheres that break when agitated and thus cause the formation of undesirable fine particles.

Moreover, the method according to the invention makes it possible to homogeneously maintain the morphologies of the granules which thus change at similar rates during, for example, a solid-state post-condensation step.

Finally, the elimination of the expansion phenomenon is advantageous in that the granules do not exhibit increased agglomeration.

The crystallization step according to the invention can be carried out in the presence or in the absence of a stream of inert gas, such as, for example, a stream of dinitrogen.

According to a particularly advantageous embodiment, this step is carried out without a stream of inert gas, thus going against what was known for polyethylene naphthalate in order to limit the expansion phenomenon. Moreover, the absence of a stream of gas during the crystallization is advantageous in the context of a subsequent solid-state post-condensation step, since such a step consumes such gases. In this way, the method consumes less gas during the implementation of a step for increasing the molar mass of the polyester.

According to a particular embodiment, the method according to the invention also comprises a step of recovering the crystallized polyester.

According to a particular embodiment, the method according to the invention comprises a step of drying the polyester comprising a 1,4:3,6-dianhydrohexitol upstream of the crystallization step.

This step is carried out so as to obtain a water content in the polyester of less than 0.1% and most particularly less than 0.05%. The drying of the polyester advantageously makes it possible to contribute to reducing the expansion phenomenon, in particular for pressures during the crystallization step of from 600 to 800 mbar absolute.

According to a particular embodiment, the method according to the invention also comprises a step of increasing the molar mass. This step of increasing the molar mass may is carried out by post-polymerization of the polyester. Preferably, the post-polymerization is implemented by a step of solid-state post-condensation (SSP).

The solid-state post-condensation is carried out at a temperature between the glass transition temperature and the melting point of the polymer. Thus, in order to carry out this SSP step, it is necessary for the polyester to be semi-crystalline and crystallized. Since post-condensation is a step well-known to a person skilled in the art, the latter may adjust the operating conditions based on the polyester for which they wish to increase the molar mass.

Consequently, the invention also relates to a method for increasing the molar mass of a semi-crystalline polyester comprising at least one 1,4:3,6-dianhydrohexitol unit, and comprising the following steps of:

providing a semi-crystalline polyester comprising at least one 1,4:3,6-dianhydrohexitol unit as defined previously, crystallizing said polyester, increasing the molar mass of said crystallized polyester by solid-state post-condensation, said method being characterized in that the crystallization step is performed at a pressure of at least 600 mbar absolute.

As previously stated, the crystallization step is specifically carried out under a pressure of at least 700 mbar absolute, at least 800 mbar absolute, at least 900 mbar absolute, and even at least 1000 mbar absolute. Above 800 mbar absolute of pressure, the expansion phenomenon of the polyester is completely eliminated.

Likewise, the polyester provided in the first step may be as defined previously.

According to a particular embodiment, the step of crystallizing the semi-crystalline polyester comprising a 1,4:3,6-dianhydrohexitol unit is carried out under a pressure within the range extending from 600 mbar absolute up to atmospheric pressure.

According to another particular embodiment, the crystallization step is carried out at a pressure of from 800 mbar absolute to 1000 mbar absolute.

According to a particular embodiment, the method for increasing the molar mass comprises a step of recovering the polyester after increasing the molar mass.

This method of increasing the molar mass is particularly advantageous in that it makes it possible to obtain semi-crystalline polyesters having an increased molar mass, while limiting, or even eliminating, the expansion phenomenon of said polyester during the crystallization step. Thus, the polyester recovered at the end of the method does not have very fragile empty spheres that break when agitated and thus cause the formation of undesirable fine particles. Likewise, in the absence of expansion, the polyester, which is generally in the form of granules, has a homogeneous macroscopic structure, which makes it possible to obtain uniform rates during the post-condensation step and therefore, at the end of the process, a homogeneity of the molar mass of said polyester.

The invention is also described in the examples below, which are purely illustrative and in no way limit the scope of the present invention.

EXAMPLES

In all the examples, the formula "mol %/diols" refers to the molar % of isosorbide relative to the diols.

The reduced viscosity in solution ($\eta$red) is evaluated using an Ubbelohde capillary viscometer at 35° C. in an equal-mass mixture of phenol and ortho-dichlorobenzene after dissolving the polymer at 135° C. with magnetic stirring. For these measurements, the concentration of the polymer introduced is 5 g/l.

Degree of expansion: ratio of the amount of expanded polyester granules/total amount of polyester×100.

Tg: Glass transition temperature

Tm: Melting point

For the illustrative examples presented below, the following reagents were used:

Isosorbide (purity >99.5%) Polysorb® P—Roquette Frères 1,4-Cyclohexanedimethanol (purity 99%, mixture of cis and trans isomers)

Terephthalic acid (purity 99+%)—Accros

Cobalt acetate tetrahydrate (99.999%)—Sigma-Aldrich

Ethylene glycol (purity >99.8%)—Sigma-Aldrich

Antioxidant: Irganox 1010—BASF SE

Antioxidant: Hostanox P-EPQ—Clariant

Irgamod 195—BASF SE

Polymerization additive limiting etherification reactions: Tetraethylammonium hydroxide in solution at 20% by weight in water—Sigma-Aldrich Germanium dioxide (>99.99%)—Sigma-Aldrich Dimethyltin oxide—(99%) Sigma-Aldrich Sodium acetate (>99%)—Sigma-Aldrich Example 1: Synthesis of the Polyesters In this example, four polyesters (1A, 1B, 10 and 1D), for an implementation according to the invention, and a comparative polyester (1E) were synthesized.

Polyester 1A 21.05 kg of terephthalic acid, 4.4 kg of isosorbide and 15.7 kg of cyclohexanedimethanol are introduced into a 100-L reactor. Next, 12 g of dimethyltin oxide (catalyst) and 17.4 g of Irgamod 195 are also added to the paste.

The reaction mixture is then gradually heated to 250° C. under 5 bar absolute of pressure and with constant stirring. The water formed by esterification is continuously eliminated during the reaction. The degree of esterification is estimated based on the mass of distillate collected. After 4 h 30 of esterification, the pressure of the reactor is reduced to atmospheric pressure and the temperature is brought to 260° C. Then, the pressure is reduced to 0.7 mbar absolute in 100 minutes according to a logarithmic ramp, and the temperature brought to 280° C. After 100 minutes, the polymer is poured into a water tank, then cut up in the form of cylindrical granules.

The properties of the final polyester are as follows: $\eta$red=54.3 ml/g, Tg=112° C., Tm=259.6° C.

The polyester also has an isosorbide content, measured by $^1$H NMR, of 17.2 mol %/diols, a mass of 100 granules=1.98 g and a water content of 0.33%.

Polyester 1B 21.05 kg of terephthalic acid, 6.4 kg of isosorbide and 13.8 kg of cyclohexanedimethanol are introduced into a 100-L reactor. Next, 12 g of dimethyltin oxide (catalyst) and 17.4 g of Irgamod 195 are added to the paste.

The reaction mixture is then gradually heated to 250° C. under 5 bar absolute of pressure and with constant stirring. The water formed by esterification is continuously eliminated during the reaction. The degree of esterification is estimated based on the mass of distillate collected. After approximately 5 h of esterification, the pressure of the reactor is reduced to atmospheric pressure and the temperature is brought to 260° C. Then, the pressure is reduced to 0.7 mbar absolute in 1 h 30 according to a logarithmic ramp, and the temperature brought to 280° C. After 190 minutes, the polymer is poured into a water tank, then cut up in the form of cylindrical granules.

The properties of the final polyester are as follows: $\eta$red=51.8 ml/g, Tg=118° C.

The polyester also has an isosorbide content measured by $^1$H NMR, of 27.1 mol %/diols, a mass per 100 granules=0.91 g and a water content of 0.43%.

Polyester 1C 29.0 kg of terephthalic acid, 2.2 kg of isosorbide and 12.1 kg of ethylene glycol are introduced into a 100-L reactor. Next, 10.5 g of germanium dioxide, 2.2 g of cobalt acetate, 17.7 g of Hostanox PEPQ, 17.7 g of Iragnox 1010 and 5.4 g of aqueous solution (20% by weight) of tetraethylammonium hydroxide are also added to the paste.

The reaction mixture is then gradually heated to 250° C. under 3 bar absolute of pressure and with constant stirring. The water formed by esterification is continuously eliminated during the reaction. The degree of esterification is estimated based on the mass of distillate collected. After approximately 3 h of esterification, the pressure of the reactor is reduced to atmospheric pressure in 15 min. Then, the pressure is reduced to 0.7 mbar absolute in 30 min according to a logarithmic ramp, and the temperature brought to 265° C. After 100 minutes, the polymer is poured into a water tank, then cut up in the form of cylindrical granules.

The properties of the final polyester are as follows: ηred=49.8 ml/g, Tg=87° C.

The polyester also has an isosorbide content measured by $^1$H NMR of 6.2 mol %/diols, a mass per 100 granules=1.31 g and a water content=0.40%.

Polyester 1D 29.0 kg of terephthalic acid, 3.7 kg of isosorbide and 11.4 kg of ethylene glycol are introduced into a 100-L reactor. Next, 11.6 g of germanium dioxide, 2.7 g of cobalt acetate, 17.7 g of Hostanox PEPQ, 17.7 g of Iragnox 1010 and 6.2 g of aqueous solution (20% by weight) of tetraethylammonium hydroxide are also added to the paste.

The reaction mixture is then gradually heated to 250° C. under 3 bar absolute of pressure and with constant stirring. The water formed by esterification is continuously eliminated during the reaction. The degree of esterification is estimated based on the mass of distillate collected. After approximately 3 h 30 of esterification, the pressure of the reactor is reduced to atmospheric pressure in 15 min. Then, the pressure is reduced to 0.7 mbar absolute in 30 min according to a logarithmic ramp, and the temperature brought to 265° C. After 110 minutes, the polymer is poured into a water tank, then cut up in the form of cylindrical granules.

The properties of the final polyester are as follows: ηred=47.7 ml/g, Tg=91° C.

The polyester also has an isosorbide content, measured by $^1$H NMR of 10.2 mol %/diols, a mass per 100 granules=1.17 g and a water content of 0.47%.

Polyester 1E: Comparative Polyester Without Isosorbide 695 g of terephthalic acid and 337 g of ethylene glycol are introduced into a 3-L reactor. 0.2 g of germanium oxide and 50 mg of sodium acetate are also added to the paste.

The reaction mixture is then gradually heated to 270° C. under 6.6 bar absolute of pressure and with constant stirring. The water formed by esterification is continuously eliminated during the reaction. The degree of esterification is estimated based on the mass of distillate collected. After approximately 2 h 20 of esterification, the pressure of the reactor is reduced to atmospheric pressure in 20 min. Then, the pressure is reduced to 0.7 mbar absolute in 90 min according to a logarithmic ramp, and the temperature brought to 280° C. After 50 minutes, the polymer is poured into a water tank, then cut up in the form of cylindrical granules.

The properties of the final polymer are as follows: ηred=59.1 ml/g, Tg=78° C., Tm=242° C. The final polymer also has a mass per 100 granules=1.1 g, and a water content of 0.34%.

Example 2: Demonstration of the Expansion Phenomenon During Crystallization

The aim of this example is to demonstrate and evaluate the expansion phenomenon during a step of crystallizing a polyester containing isosorbide.

Test 1

75 g of granules of polyester 1A were rotated in a 500 ml grooved round-bottom flask. A vacuum of approximately 0.5 mbar absolute is applied, then the round-bottom flask is immersed in an oil bath in order to be heated o first at 110° C. for 15 minutes in order to eliminate any traces of water.

The granules are then heated to the crystallization temperature of 165° C. with a ramp of 5° C./min. The crystallization temperature is maintained for 100 minutes to ensure that crystallization is complete. The crystallized granules are finally slowly cooled before being separated for visual identification of the expanded granules.

These experimental conditions cause a degree of expansion of 16±2% and the agglomeration of the granules around these expanded elements. It should be noted that a bath temperature of 165° C. corresponds to a temperature of 160° C. on contact with the inner wall of the round-bottom flask.

Test 2

The same conditions as test 1 are reproduced from granules of polyester 1B. Only the crystallization temperature is modified to 175° C. in order to correspond to the optimal crystallization temperature for the isosorbide content of this polyester.

These experimental conditions cause a degree of expansion of 100%.

Test 3

The same conditions as test 1 are reproduced from granules of polyester 1C. Only the crystallization temperature is modified to 16° C. in order to correspond to the optimal crystallization temperature for the isosorbide content of this polyester.

These experimental conditions cause a degree of expansion of 80%.

Test 4

The same conditions as test 1 are reproduced from granules of polyester 1D. Only the crystallization temperature is modified to 16° C. in order to correspond to the optimal crystallization temperature for the isosorbide content of this polyester.

These experimental conditions cause a degree of expansion of 80%.

Comparative Test 5

The same conditions as test 1 are reproduced from granules of polyester 1E, which does not contain isosorbide.

Under high vacuum, the crystallization of the polyethylene terephthalate does not lead to the expansion of the granules.

The different tests carried out demonstrate that the expansion phenomenon is associated with the presence of the isosorbide units in the polyesters.

Example 3: Limiting the Expansion Phenomenon

Test 1 is reproduced with different pressure values. Thus, from granules of polyester 1A, different vacuum conditions were applied during the crystallization.

The results are presented in Table 1 below:

TABLE 1

| Vacuum (mbar absolute) | Degree of expansion (%) |
|---|---|
| 0.5 | 16 |
| 10 | 16 |
| 20 | 9 |
| 40 | 10 |

TABLE 1-continued

| Vacuum (mbar absolute) | Degree of expansion (%) |
|---|---|
| 200 | 3 |
| 600 | 1 |
| 800 | 0 |
| 900 | 0 |
| 1000 (with N2) | 0 |
| 1000 (without N2) | 0 |

From 600 mbar absolute of pressure, the degree of expansion obtained after crystallization decreases greatly. The degree of expansion is zero when the pressure is at least 800 mbar absolute.

This example thus demonstrates that the conditions according to the invention make it possible to reduce, or even to completely eliminate, the expansion phenomenon of polyester containing isosorbide during the crystallization step.

Example 4: Validation of the Results with Other Polyesters

Tests 2, 3, and 4 were reproduced with different pressure values in order to confirm the results obtained with polyester 1A in the previous example.

The results are presented in Table 2 below:

TABLE 2

| Vacuum (mbar absolute) | Degree of expansion (%) | | | |
|---|---|---|---|---|
| | Polyester 1B | Polyester 1C | Polyester 1D | Comparative polyester 1E |
| 0.5 | 100 | 78 | 84 | 0 |
| 800 | 0 | 0 | 0 | 0 |
| 1000 (without N2) | 0 | 0 | 0 | 0 |
| 1000 (with N2) | 0 | 0 | 0 | 0 |

The results show that a pressure of 800 mbar absolute during the crystallization makes it possible to eliminate the expansion phenomenon in polyesters 1B, 1C and 1D having, respectively, a molar % of isosorbide relative to diols of 27.1%, 6.2% and 10.2%.

This example confirms that the pressure conditions according to the invention make it possible to eliminate the expansion phenomenon in polyesters containing isosorbide.

Example 5: Impact of the Water Content on the Expansion Phenomenon

Test 1 is reproduced, varying the water content of the polyester 1A. The material is submerged in water for 72 h or 160 h or dried at 110° C. in a ventilated oven. After crystallization, the degree of expansion is evaluated. The results are presented in Table 3.

TABLE 3

| | Water content (%) | Degree of expansion (%) |
|---|---|---|
| Material submerged for 160 h | 0.63 | 41 |
| Material submerged for 72 h | 0.42 | 27 |
| Unmodified material | 0.33 | 16 |
| Material dried for 72 h at 110° C. | 0.03 | 2 |
| Material dried for 144 h at 110° C. | 0.02 | 1.5 |

The results show that the expansion phenomenon also depends on the water content of the polyester, and that it is considerably reduced when the material is dried.

This behavior was also confirmed from test 2, varying the water content of the polyester 1B. The results show that the crystallization of the polymer 1B having a water content of 0.43% leads to a degree of expansion of 100%, whereas drying to obtain a water content of 0.04% makes it possible to reduce the degree of expansion to 8% during the crystallization.

The invention claimed is:

1. A method for crystallizing a polyester comprising at least one 1,4:3,6-dianhydrohexitol unit, and comprising the following steps of:
   providing a semi-crystalline polyester comprising at least one 1,4:3,6-dianhydrohexitol unit, and
   crystallizing said polyester,
   wherein the crystallization step is performed at a pressure at a range of from 600 to 800 mbar absolute and further comprises a step of drying the polyester upstream of the crystallization step so as to obtain a water content in the polyester of less than 0.1%.

2. The method according to claim 1, wherein the 1,4:3,6-dianhydrohexitol unit is isosorbide.

3. The method according to claim 1, wherein the polyester provided is a semi-crystalline thermoplastic polyester comprising:
   at least one 1,4:3,6-dianhydrohexitol unit (A),
   at least one diol unit (B), other than the 1,4:3,6-dianhydrohexitol unit (A),
   at least one aromatic dicarboxylic acid unit (C).

4. The method according to claim 3, wherein the diol unit (B) of said polyester, other than the 1,4:3,6-dianhydrohexitol unit (A), is an alicyclic diol unit selected from the group comprising 1,4-cyclohexanedimethanol, 1,2-cyclohexanedimethanol, 1,3-cyclohexanedimethanol, spiroglycol, tricyclo [$5.2.1.0^{2,6}$]decanedimethanol (TCDDM), 2,2,4,4-tetramethyl-1,3-cyclobutanediol, tetrahydrofurandimethanol (THFDM), furandimethanol, 1,2-cyclopentanediol, 1,3-cyclopentanediol, 1,2-cyclohexanediol, dioxane glycol (DOG), norbornane diols, adamanthane diols, pentacyclopentadecane dimethanols or a mixture of these diols.

5. The method according to claim 3, wherein the diol unit (B) of said polyester, other than the 1,4:3,6-dianhydrohexitol unit (A), is a saturated linear non-cyclic aliphatic diol unit selected from the group comprising ethylene glycol, 1,3-propanediol, 1,4-butanediol, 1,5-pentanediol, 1,6-hexanediol, 1,8-octanediol and/or 1,10-decanediol.

6. The method according to claim 3, wherein the unit (C) of said polyester is selected from the group comprising derivatives of naphthalates, terephthalates, furanoates, thiophene dicarboxylate, pyridine dicarboxylate, isophthalates, or mixtures thereof.

7. The method according to claim 1, wherein it also comprises a step of drying the polyester before the crystallization step so as to obtain a water content of the polyester of less than 0.05%.

8. The method according to claim 1, wherein it also comprises a step of increasing the molar mass of said polyester after the crystallization step.

9. The method according to claim 8, wherein the molar mass of said polyester is increased by solid-state postcondensation (SSP).

10. A method for increasing the molar mass of a polyester comprising at least one 1,4:3,6-dianhydrohexitol unit, and comprising the following steps of:

providing a semi-crystalline polyester comprising at least one 1,4:3,6-dianhydrohexitol unit, crystallizing said polyester, and increasing the molar mass of said crystallized polyester by solid-state post-condensation wherein the crystallization step is performed at a pressure at a range of from 600 to 800 mbar absolute and further comprises a step of drying the polyester upstream of the crystallizaiton step so as to obtain a water ontent in the polyester of less than 0.1%.

* * * * *